United States Patent
Waterman et al.

(10) Patent No.: US 10,899,955 B2
(45) Date of Patent: Jan. 26, 2021

(54) EMULSIONS, TREATMENT FLUIDS AND METHODS FOR TREATING SUBTERRANEAN FORMATIONS

(71) Applicant: KEMIRA OYJ, Helsinki (FI)

(72) Inventors: Paul Waterman, Atlanta, GA (US);
Logan Jackson, Norcross, GA (US);
Danny Nguyen, Atlanta, GA (US);
Ronald Robinson, Newnan, GA (US)

(73) Assignee: Kemira OYJ, Helsinki (FI)

( * ) Notice: Subject to any disclaimer, the term of this patent is extended or adjusted under 35 U.S.C. 154(b) by 140 days.

(21) Appl. No.: 15/534,071

(22) PCT Filed: Dec. 22, 2015

(86) PCT No.: PCT/US2015/067355
§ 371 (c)(1),
(2) Date: Jun. 8, 2017

(87) PCT Pub. No.: WO2016/109333
PCT Pub. Date: Jul. 7, 2016

(65) Prior Publication Data
US 2017/0362487 A1    Dec. 21, 2017

Related U.S. Application Data

(60) Provisional application No. 62/098,714, filed on Dec. 31, 2014.

(51) Int. Cl.
C09K 8/26    (2006.01)
C09K 8/88    (2006.01)
(Continued)

(52) U.S. Cl.
CPC .............. *C09K 8/26* (2013.01); *C09K 8/68* (2013.01); *C09K 8/885* (2013.01); *C09K 2208/28* (2013.01)

(58) Field of Classification Search
CPC ... C09K 8/26; C09K 8/66; C09K 8/82; C09K 8/84
See application file for complete search history.

(56) References Cited

U.S. PATENT DOCUMENTS 4,405,728 A    9/1983    Krebs et al.
5,286,806 A *  2/1994    Neff .................... C08F 8/12
                                              525/369

(Continued)

FOREIGN PATENT DOCUMENTS

| EP | 271943 | 6/1988 |
| GB | 2216573 | 10/1989 |
| WO | WO 2013/124058 | 8/2013 |

OTHER PUBLICATIONS

International Search Report from PCT/US2015/067355, dated Feb. 6, 2016.

*Primary Examiner* — Aiqun Li
(74) *Attorney, Agent, or Firm* — Eversheds Sutherland (US) LLP

(57) ABSTRACT

Emulsions, treatment fluids and methods for treating subterranean formations are provided, wherein the emulsions comprise water, a water-immiscible liquid, one or more polymers, one or more ethoxylated amine compounds and optionally, one or more organic or inorganic salts. The emulsions are particularly suitable for use in harsh brine conditions.

17 Claims, 4 Drawing Sheets

(51) Int. Cl.
*C09K 8/68* (2006.01)
*C09K 8/36* (2006.01)

(56) References Cited

U.S. PATENT DOCUMENTS

| | | | |
|---|---|---|---|
| 6,210,585 B1* | 4/2001 | Tippett | B01F 17/0021 |
| | | | 210/698 |
| 8,640,771 B2 | 2/2014 | Frederick et al. | |
| 2011/0049417 A1* | 3/2011 | Swift | C09K 3/22 |
| | | | 252/88.1 |

* cited by examiner ary emulsion to a commercially available emulsion.
EMULSIONS, TREATMENT FLUIDS AND METHODS FOR TREATING SUBTERRANEAN FORMATIONS

CROSS REFERENCE TO RELATED APPLICATIONS

This application is a national stage application under 35 U.S.C. § 371 of International Application No. PCT/US2015/067355, filed Dec. 22, 2015, which claims priority to U.S. Provisional Patent Application No. 62/098,714, filed Dec. 31, 2014. The complete disclosure of each of the above-identified applications is fully incorporated herein by reference.

FIELD OF THE ART

The present disclosure generally relates to emulsions, treatment fluids and methods for treating subterranean formations.

BACKGROUND

In the drilling, completion, and stimulation of oil and gas wells, well treatment fluids are often pumped into well bore holes under high pressure and at high flow rates causing the rock formation surrounding the well bore to fracture. As the fluid is pumped through the pipe at high flow rates (thousands of GPM) there is a significant amount of frictional resistance, which results in large energy requirements.

In order to reduce the friction between the well treatment fluid and the bore linings, friction pressure reducing additives have been combined with the treatment fluids and added during pumping so as to reduce pump pressure. For example, a type of well treatment commonly utilized for stimulating hydrocarbon production from a subterranean zone penetrated by a well bore is hydraulic fracturing. Hydraulic fracturing, also referred to as fracing (or fracking), is used to initiate production in low-permeability reservoirs and re-stimulate production in older producing wells. In hydraulic fracing, a fluid composition is injected into the well at pressures effective to cause fractures in the surrounding rock formation. Fracing is used both to open up fractures already present in the formation and create new fractures.

Water soluble polymers can be used as friction reducers in well treatment fluids to alter the rheological properties of the fluid so that the turbulent flow is minimized, thereby preventing consequent energy loss in the fluid as it is pumped through the pipe. These types of treatments are often called "slick water treatments or slick water fracs." In some instances, water soluble friction reducing polymers are suspended in water in oil emulsions, wherein upon addition to the aqueous treatment fluid, the emulsion must invert to release the friction reducing polymer into the fluid. Performance in the field depends upon the ability of the emulsions to invert, or break, quickly. Certain conditions, for example high brine conditions, can hinder the breaking of the emulsion. In particular, high brines including potassium chloride, sodium chloride, seawater and other API base brines that include calcium or magnesium hardness interfere with the inversion of emulsion polymers such that the emulsions do not break or generate the rheology needed to accomplish superior friction reduction.

BRIEF SUMMARY

Disclosed herein are emulsions comprising: water; a water-immiscible liquid; greater than about 10% by weight of one or more polymers; about 0.1% to about 5% by weight of one or more ethoxylated amine compounds or an inverting surfactant composition comprising one or more inverting surfactants and one or more ethoxylated amine compounds; and optionally, at least about 0.5% of one or more organic or inorganic salts. Treatment fluids comprising the emulsions, as well as methods for treating subterranean formations with the emulsions or treatment fluids, are also provided.

The disclosure may be understood more readily by reference to the following detailed description of the various features of the disclosure and the examples included therein.

DETAILED DESCRIPTION

Figure 1:
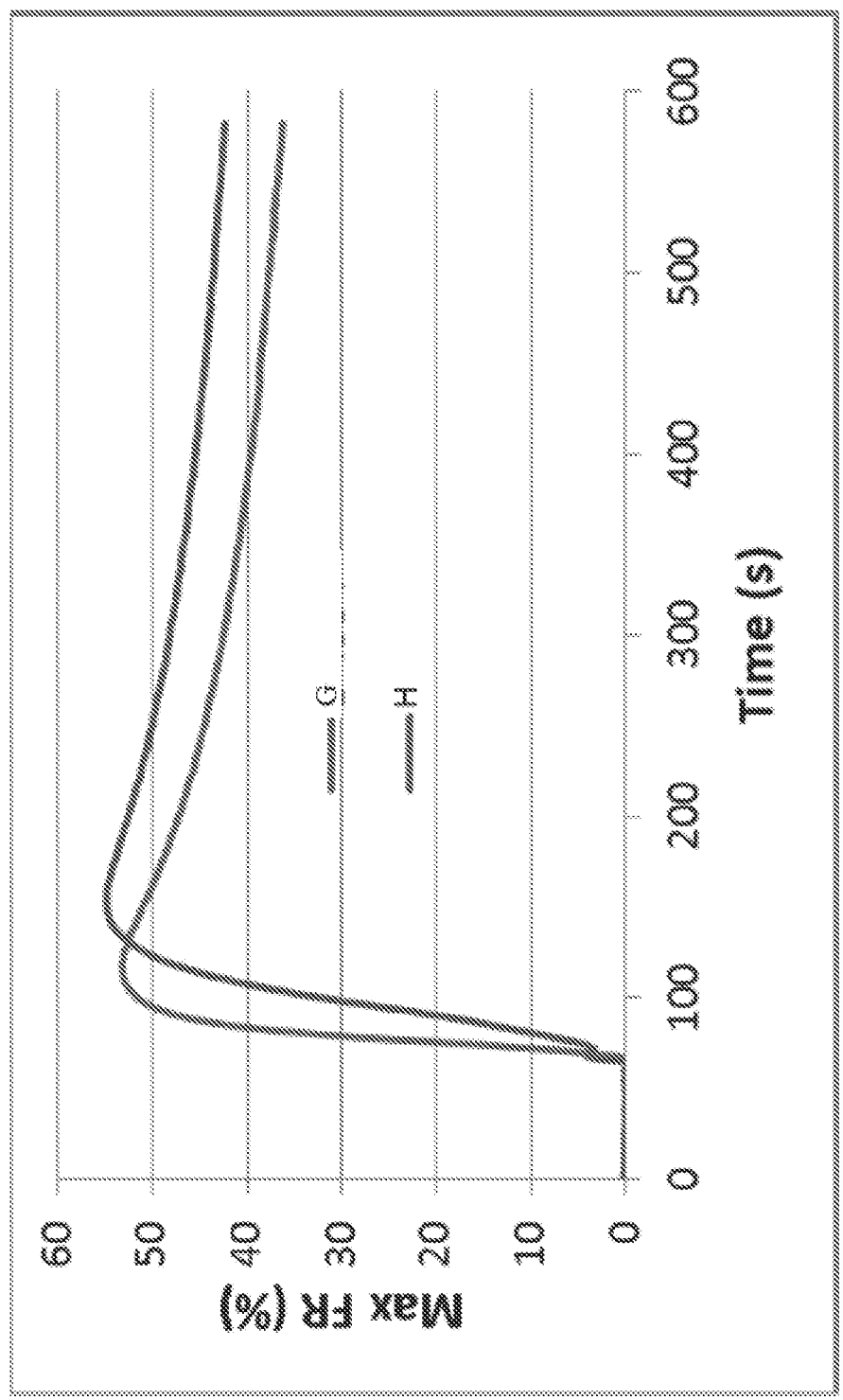
FIG. 1 shows the friction reduction profile in Marcellus brine at 5° C. of an exemplary emulsion compared to a commercially available emulsion.

The present disclosure provides aqueous treatment fluids and methods for their use in aqueous brines. The exemplary emulsions, treatment fluids and methods may be used to provide rapid and enhanced polymer inversion in aqueous brines, for example in harsh brine conditions such as Marcellus brine. The exemplary emulsions, treatment fluids and methods may be used at a range of temperatures, even at low temperatures, without loss of polymer performance. In certain embodiments, the methods relate to improving friction reduction in aqueous brines by inverting an inverse emulsion comprising one or more polymers, an emulsifying surfactant composition, an inverting surfactant composition comprising one or more ethoxylated amine compounds and one or more organic or inorganic salts.

In exemplary embodiments, the emulsions, treatment fluids and methods can be used to carry proppants into fractures, for example in fracturing applications. High molecular weight polyacrylamides are commonly used in fracturing applications as a friction reducer. Generally, crosslinked fluids are used to carry proppants into the fractures, which typically requires additional chemicals, such as crosslinkers, buffers and breakers, to be incorporated into the fracturing fluid. In exemplary embodiments, the emulsions and treatment fluid can be used carry proppant while minimizing the use of other chemicals or additives typically required by crosslinked fluids.

In slickwater fracturing, the concentration of the friction reducer is higher and proppants which are required to prop the fissures open in order to let oil/gas flowback can be carried downhole. The water is made slick by increasing the loading of the friction reducer. Slickwater frac fluids typically have low viscosities and hence need a higher injection flow rate to carry the proppant. The exemplary emulsions, treatment fluids and methods can be used in slickwater fracturing applications. Advantageously, the exemplary emulsions and treatment fluids can be used in high brines with very fast inversion of the emulsion, very good friction reduction and with good proppant carrying capabilities at higher loadings.

Polymers

As used herein, the terms "polymer," "polymers," "polymeric," and similar terms are used in their ordinary sense as understood by one skilled in the art, and thus may be used herein to refer to or describe a large molecule (or group of such molecules) that contains recurring units. Polymers may be formed in various ways, including by polymerizing monomers and/or by chemically modifying one or more recurring units of a precursor polymer. A polymer may be a "homopolymer" comprising substantially identical recurring units formed by, e.g., polymerizing a particular monomer. A polymer may also be a "copolymer" comprising two or more different recurring units formed by, e.g., copolymerizing two or more different monomers, and/or by chemically modifying one or more recurring units of a precursor polymer. The term "terpolymer" may be used herein to refer to polymers containing three or more different recurring units. The term "polymer" as used herein is intended to include both the acid form of the polymer as well as its various salts.

In exemplary embodiments, the polymer is a friction-reducing polymer. The term "friction reducing polymer" refers to a polymer that reduces energy losses due to friction between an aqueous fluid in turbulent flow and tubular goods, e.g. pipes, coiled tubing, and the like, and/or formation. The friction reducing polymer is not intended to be limited to any particular type and may be synthetic polymers, natural polymers, or viscoelastic surfactants. Suitable friction reducing polymers are typically latex polymers or copolymers of acrylamides, acrylates, guar gum, polyethylene oxide, and combinations thereof. The friction reducing polymers may be anionic, cationic, amphoteric or non-ionic depending on desired application. In addition, various combinations can be used including but not limited to hydrophilic/hydrophobic combinations, functionalized natural and/or synthetic blends of the above, or the like. The friction reducing polymers may be anionic, cationic, amphoteric or non-ionic depending on desired application. In addition, various combinations can be used including but not limited to hydrophilic/hydrophobic combinations, functionalized natural and/or synthetic blends of the above, or the like.

In exemplary embodiments, the polymer is a polymer useful in emulsion compositions or an emulsion polymer.

In exemplary embodiments, the polymer is a polymer useful for enhanced oil recovery applications. The term "enhanced oil recovery" or "EOR" (also known as tertiary mineral oil production) refers to a process for mineral oil production in which an aqueous injection fluid comprising at least a water soluble polymer is injected into a mineral oil deposit. The techniques of tertiary mineral oil production include what is known as "polymer flooding". Polymer flooding involves injecting an aqueous solution of a water-soluble thickening polymer through the injection boreholes into the mineral oil deposit. As a result of the injection of the polymer solution, the mineral oil is forced through the cavities in the formation, proceeding from the injection borehole, in the direction of the production borehole, and the mineral oil is produced through the production borehole. By virtue of the fact that the polymer formulation has an increased viscosity as compared to the viscosity of water, the risk is reduced that the polymer formulation breaks through to the production borehole. It is thus possible to mobilize additional mineral oil in the formation. Details of polymer flooding and of polymers suitable for this purpose are disclosed, for example, in "Petroleum, Enhanced Oil Recovery, Kirk-Othmer, Encyclopedia of Chemical Technology, online edition, John Wiley & Sons, 2010". For polymer flooding, a multitude of different water-soluble thickening polymers have been proposed, especially high molecular weight polyacrylamide, copolymers of acrylamide and further comonomers, for example vinylsulfonic acid or acrylic acid. Polyacrylamide may be partly hydrolyzed polyacrylamide, in which some of the acrylamide units have been hydrolyzed to acrylic acid. It is known in the art to use inverse emulsions of polyacrylamide (co)polymers for enhanced oil recovery (EOR) in particular for use on offshore platforms. Such inverse emulsions typically comprise about 30 wt. % of polymers. For use inverse emulsions are simply diluted with water to the final concentration of the polymer.

In exemplary embodiments, the one or more polymers is water soluble. In exemplary embodiments, the one or more polymers comprises an acrylamide-containing polymer. In exemplary embodiments, the one or more polymers consists essentially of acrylamide-containing polymers. In exemplary embodiments, the one or more polymers comprises polyacrylamide, copolymers of acrylamide, sulfonated polyacrylamide, cationic polyacrylamide, anionic polyacrylamide, and partially hydrolyzed acrylamide.

In exemplary embodiments, the one or more comprises acrylamide or partially hydrolyzed acrylamide and one or more nonionic and/or anionic monomers. In exemplary embodiments, the one or more polymers has an overall anionic charge and comprises acrylamide or partially hydrolyzed acrylamide and one or more nonionic and/or anionic monomers. In exemplary embodiments, the one or more polymers comprises about 10% to about 60% anionic monomers by weight.

Suitable non-ionic monomers include but are not limited to acrylamide, N-alkylacrylamides, N,N-dialkylacrylamides, methacrylamide, N-vinylmethylacetamide or formamide, vinyl acetate, vinyl pyrrolidone, alkyl methacrylates, acrylonitrile, N-vinylpyrrolidone other acrylic (or other ethylenically unsaturated) ester or other water insoluble vinyl monomers such as styrene or acrylonitrile.

The term "anionic monomer" refers to a monomer which possesses a negative charge. Representative anionic monomers include acrylic acid, sodium acrylate, ammonium acrylate, methacrylic acid, 2-acrylamido-2-methylpropane-sulfonic acid (AMPS), vinyl sulfonic acid, styrene sulfonic acid, maleic acid, sulfopropyl acrylate or methacrylate or other water-soluble forms of these or other polymerizable carboxylic or sulphonic acids, sulfomethylated acrylamide, allyl sulfonate, itaconic acid, acrylamidomethylbutanoic acid, fumaric acid, vinylphosphonic acid, allylphosphonic acid, phosphonomethylated acrylamide, methacrylate, itaconate, 2-acrylamido 2-methyl propane sulphonate, sulfoalkyl(meth)acrylic acids, sulfonated styrenes, unsaturated dicarboxylic acids, sulfoaklyl(meth)acrylamides, salts of said acids and the like, or another anionic ethylenically unsaturated compound.

The term "cationic monomer" refers to a monomer which possesses a positive charge. Representative cationic monomers include dialkylaminoalkyl acrylates and methacrylates and their quaternary or acid salts, including, but not limited to, dimethylaminoethyl acrylate methyl chloride quaternary salt, dimethylaminoethyl acrylate methyl sulfate quaternary salt, dimethyaminoethyl acrylate benzyl chloride quaternary salt, dimethylaminoethyl acrylate sulfuric acid salt, dimethylaminoethyl acrylate hydrochloric acid salt, diethylaminoethyl acrylate, methyl chloride quaternary salt, dimethylaminoethyl methacrylate methyl chloride quaternary salt, dimethylaminoethyl methacrylate methyl sulfate quaternary salt, dimethylaminoethyl methacrylate benzyl chloride quaternary salt, dimethylaminoethyl methacrylate sulfuric acid salt, dimethylaminoethyl methacrylate hydrochloric acid salt, dim ethyl aminoethyl methacryloyl hydrochloric acid salt, dialkylaminoalkylacrylamides or methacrylamides and their quaternary or acid salts such as acrylamidopropyltrimethylammonium chloride, dimethylaminopropyl acrylamide methyl sulfate quaternary salt, dimethylaminopropyl acrylamide sulfuric acid salt, dimethylaminopropyl acrylamide hydrochloric acid salt, methacrylamidopropyltrimethylammonium chloride, dimethylaminopropyl methacrylamide methyl sulfate quaternary salt, dimethylaminopropyl methacrylamide sulfuric acid salt, dimethylaminopropyl methacrylamide hydrochloric acid salt, diethylaminoethylacrylate, diethylaminoethylmethacrylate and diallyldialkylammonium halides such as diallyldiethylammonium chloride and diallyldimethyl ammonium chloride. Alkyl groups are generally $C_{1-8}$ alkyl.

In a particular embodiment, the one or more polymers comprises acrylamide or partially hydrolyzed acrylamide and one or more anionic monomers.

In exemplary embodiments, the one or more polymers comprises acrylamide or partially hydrolyzed acrylamide and one or more monomers selected from the group consisting of acrylic acid, acrylate salt, 2-acrylamido-2-methylpropane sulfonic acid, N,N-dimethylacrylamide, vinyl sulfonic acid, N-vinyl sulfonic acetamide, N-vinyl formamide, itaconic acid, methacrylic acid, salts thereof, and combinations thereof. In a particular embodiment, the one or more polymers comprises acrylamide or partially hydrolyzed acrylamide and one or more monomers selected from the group consisting of acrylic acid, 2-acrylamido-2-methylpropane sulfonic acid, and methacrylic acid, and salts thereof. In a particular embodiment, the one or more polymers comprises acrylamide or partially hydrolyzed acrylamide and one or more monomers selected from the group consisting of acrylic acid and salts thereof.

In certain embodiments, the polymer comprises acrylamide and one or more monomers selected from the group consisting of: acrylic acid and its salts, methacrylamide, methacrylic acid and its salts, maleic acid and its salts, methyl acrylate, ethyl acrylate, propyl acrylate, methyl methacrylate, ethyl methacrylate, dimethylaminoethyl acrylate and its methylchloride and methosulfate quaternaries, dimethylaminoethyl methacrylate and its methylchloride and methosulfate quaternaries, diethylaminoethyl acrylate and its methylchloride and methosulfate quaternaries, diethylaminoethyl methacrylate and its methylchloride and methosulfate quaternaries, hydroxyethyl acrylate, hydroxyethyl methacrylate, styrene, acrylonitrile, 2-acrylamido-2-methylpropane sulfonic acid and its salts, 3-(methylacrylamido)-propyltrimethylammonium chloride, dimethylaminopropylmethacrylamide, isopropylaminopropylmethacrylamide, methacrylamidopropylhydroxyethyldimethylammonium acetate, vinyl methyl ether, vinyl ethyl ether, alkali metal and ammonium salts of vinyl sulfonic acid, vinyl pyridine, vinyl pyrrolidone, vinyl imidazole, diallyldimethylammonium chloride, styrene sulfonic acid and its salts, and the like.

In exemplary embodiments, the partially hydrolyzed acrylamide is acrylamide wherein the about 3% to about 70% of the amide groups have been hydrolyzed to carboxyl groups.

In exemplary embodiments, the one or more polymers comprises an anionic polyacrylamide. In exemplary embodiments, the anionic polyacrylamide is a copolymer comprising one or more anionic monomers and acrylamide monomers. Exemplary salts of these anionic monomers include but are not limited to sodium and ammonium salts. In one embodiment, the polymer is an anionic polymer. In a particular embodiment, the anionic polymer has about 10% to about 60% charge, about 10% to about 50% charge, about 15% to about 45% charge, about 20% to about 40% charge, or about 25% to about 35% charge.

In exemplary embodiments, the one or more polymers comprises a cationic polyacrylamide. In exemplary embodiments, the cationic polyacrylamide is a copolymer comprising one or more cationic monomers and acrylamide monomers. In one embodiment, the polymer is a cationic polymer.

In one embodiment, the one or more polymers comprises an amphoteric polymer. In one embodiment, the one or more polymers comprises a non-ionic polymer.

In exemplary embodiments, one or more polymers is a copolymer of acrylamide or partially hydrolyzed acrylamide and acrylic acid or an acrylate salt. In exemplary embodiments, the one or more polymers comprises at least about 30 mole %, about 40 mole %, about 50 mole %, about mole 60%, about mole 70%, about mole 80%, or about mole 90% acrylamide or partially hydrolyzed acrylamide. In exemplary embodiments, the one or more polymers comprises at least about 10 mole %, about 20 mole %, about 30 mole %, about 40 mole %, about 50 mole %, about mole 60%, or about mole 70% acrylic acid or acrylate salts. In exemplary embodiments, the acrylate salt comprises ammonium acrylate. In exemplary embodiments, the one or more polymers comprises about 30 mole % to about 90 mole %, or about 60 mole % to about 90 mole %, acrylamide or partially hydrolyzed acrylamide. In exemplary embodiments, the one or more polymers comprises about 10 mole % to about 70 mole %, or about 10 mole % to about 40 mole %, acrylic acid or an acrylate salt.

The exemplary polymers may be included in the treatment fluids in an amount sufficient to provide the desired properties. In some embodiments, a polymer may be present in an amount in the range of from about 0.1 to about 40, or about 0.1 to about 20, or about 0.1 to about 10, or about 0.1 to about 5, or about 0.25 to about 1, Gallons Per Thousand Gallons of the aqueous treatment fluid (GPTG). The polymers may be added to slick water treatments at concentrations of 0.1 to 20 GPTG of treatment fluid. In other embodiments, the polymer is added at a concentration of 0.25 to about 2.5 GPTG of treatment fluid.

The polymers of the present embodiments should have a molecular weight sufficient to provide desired properties. For example, those polymers used for friction reduction should have higher molecular weights to provide a desirable level of friction reduction. The polymers used for EOR applications should have sufficient molecular weight to provide the desired viscosity to mobilize oil in a desirable manner. In some exemplary embodiments, the weight average molecular weight of a polymer may be in the range of from about 7,500,000 to about 30,000,000 Dalton. Those of ordinary skill in the art will recognize that polymers having molecular weights outside the listed range may still provide desirable properties in the aqueous treatment fluid.

In exemplary embodiments, the polymer is used for EOR applications.

Suitable polymers of the present embodiments may be in an acid form or in a salt form. A variety of salts may be made by neutralizing the acid form of a monomer, for example acrylic acid or 2-acrylamido-2-methylpropane sulfonic acid, with a base, such as sodium hydroxide, ammonium hydroxide or the like. As used herein, the term "polymer" is intended to include both the acid form of the copolymer and its various salts.

Ethoxylated Amine Compounds

In exemplary embodiments, the emulsion or aqueous treatment fluid comprises one or more ethoxylated amine compounds, or a mixture ethoxylated amine compounds. As referred to herein, "ethoxylated amine compounds" includes, for example, amine or amide compounds comprising two ethoxy or polyethoxy groups and one group selected from hydrogen, alkyl, aryl, C(=O)-alkyl or C(=O)-aryl group. In certain exemplary embodiments, the ethoxylated amine compounds are nonionic amine compounds. In certain embodiments, the ethoxylated amine compounds do not comprise cationic polyoxyethylene tallow amine compounds. In certain exemplary embodiments, the ethoxylated amine compounds are nonionic amine compounds. In certain embodiments, the ethoxylated amine compounds do not comprise cationic tallow ethoxylated amine.

In exemplary embodiments the one or more ethoxylated amine compounds are compounds of Formula I:

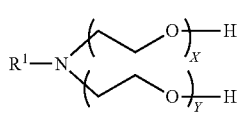

Formula I wherein $R^1$ is H, alkyl, aryl, C(=O)-alkyl, or C(=O)-aryl; and X and Y are each independently 1-20. In exemplary embodiments, an alkyl group is a saturated or unsaturated alkyl group having 8 to 26 carbon atoms. In exemplary embodiments, an aryl group is an aryl group having 6 to 18 carbon atoms. In exemplary embodiments, the alkyl group can be either saturated or unsaturated, and can be derived from, but not limited to, tallow, soybean oil, coconut oil, or cottonseed oil. In exemplary embodiments, the poly(oxyethylene) content (X+Y) of the ethoxylated amine is in the range of 3 to 20.

In certain embodiments, $R^1$ is H. In certain embodiments, $R^1$ is not H. In certain embodiments, $R^1$ is alkyl, for example is a saturated or unsaturated alkyl group having 8 to 26 carbon atoms. In certain embodiments, $R^1$ is C(=O)-alkyl, for example a carbonyl group bonded to the amine nitrogen and to a saturated or unsaturated alkyl group having 8 to 26 carbon atoms, such as N,N-bis(2-hydroxyethyl)-9-octadecenamide.

It should be understood that any numerical range recited herein is intended to include all sub-ranges subsumed therein. For example, a range of "1-10" is intended to include all sub-ranges between and including the recited minimum value of 1 and the recited maximum value of 10. Because the disclosed numerical ranges are continuous, they include every value between the minimum and maximum values.

In exemplary embodiments, the one or more ethoxylated amine compounds is polyoxyethylene fatty acid amine or a mixture of polyoxyethylene fatty acid amine compounds.

In exemplary embodiments, $R^1$ is a residue of a saturated or unsaturated fatty acid, for example a residue of caprylic acid, capric acid, lauric acid, myristic acid, palmitic acid, stearic acid, arachidic acid, behenic acid, lignoceric acid, cerotic acid, myristoleic acid, palmitoleic acid, sapienic acid, oleic acid, elaidic acid, vaccenic acid, linoleic acid, linoelaidic acid, α-linolenic acid, arachidonic acid, eicosapentaenoic acid, erucic acid, or docosahaxaenoic acid.

In exemplary embodiments, the one or more ethoxylated amine compounds is polyoxyethylene tallow amine. Tallow contains a variety of fatty acids including oleic (37-43%), palmitic (24-32%), stearic (20-25%), myristic (3-6%) and linoleic (2-3%). In exemplary embodiments, the one or more ethoxylated amine compounds includes polyoxyethylene oleic amine, polyoxyethylene palmitic amine, polyoxyethylene stearic amine, polyoxyethylene myristic amine, and polyoxyethylene linoleic amine.

Inverting Surfactant Composition

Among other things, an inverting surfactant or inverting surfactant composition may facilitate the inverting of the emulsion upon addition to the treatment fluids of the present embodiments. As those of ordinary skill in the art will appreciate, with the benefit of this disclosure, upon addition to the treatment fluid, the emulsion should invert, releasing the polymer into the treatment fluid. In exemplary embodiments, the inverting surfactant composition comprises the one or more ethoxylated amine compounds and one or more inverting surfactants.

In exemplary embodiments, the emulsion comprises an inverting surfactant composition. Representative inverting surfactants that may be added to the exemplary emulsions include those having a hydrophilic-lipophilic balance (HLB) of greater than 10; polyoxyethylene sorbitol tetraoleate; polyethylene glycol monoleate; ethoxylated alcohols, such as $C_{12-14}$ branched ethoxylated alcohol, ethoxylated octyl and nonyl phenols; ethoxylated nonyl phenol formaldehyde resin; polyethylene oxide esters of fatty acids; dioctyl esters of sodium sulfosuccinate; and other inverting surfactants disclosed in U.S. Pat. No. 3,624,019 incorporated herein by reference. The inverting surfactant should be present in an amount sufficient to provide the desired inversion of the emulsion upon contact with the water in the aqueous treatment fluid.

In exemplary embodiments, the inverting surfactant composition comprises at least 10 wt % of one or more ethoxylated amine compounds.

In exemplary embodiments, the inverting surfactant composition comprises about 65 to about 85 wt % of one or more inverting surfactants and 15 to about 35 wt % of an ethoxylated amine compound.

In exemplary embodiments, the inverting surfactant composition comprises about 70 to about 80 wt % of one or more inverting surfactants and 20 to about 30 wt % of an ethoxylated amine compound.

Salts

In exemplary embodiments, the emulsions comprise at least about 0.5% of one or more organic or inorganic salts. In exemplary embodiments, the emulsions comprise one or more organic or inorganic salts in an amount about 0.5% to about the point of saturation in the emulsion. Representative organic or inorganic salts include but are not limited to sodium chloride, sodium sulfate, sodium bromide, ammonium sulfate, ammonium chloride, lithium chloride, lithium bromide, potassium chloride, potassium bromide, magnesium sulfate, aluminum sulfate, ammonium hydrogen phosphate, sodium hydrogen phosphate, potassium hydrogen phosphate, sodium salts, lithium salts, potassium salts, magnesium salts, aluminum salts, ammonium salts, phosphate salts, sulfate salts, chloride salts, fluoride salts, citrate salts, acetate salts, tartrate salts, hydrogenphosphate salts, water soluble inorganic salts, other inorganic salts, other organic salts and mixtures thereof. In exemplary embodiments, the one or more organic or inorganic salts includes ammonium chloride.

Emulsions

Exemplary emulsions, for example water-in-oil emulsions or oil-external emulsions, may comprise water, a water-immiscible liquid, one or more polymers, an inverting surfactant composition comprising one or more ethoxylated amine compounds, and optionally one or more organic or inorganic salts. The emulsion may optionally comprise inhibitors, emulsifiers and/or other surfactants.

In exemplary embodiments, the emulsion comprises: water; a water-immiscible liquid; greater than about 10% by weight one or more polymers; about 0.1% to about 5% by weight one or more ethoxylated amine compounds; and optionally, at least about 0.5% of one or more organic or inorganic salts. In exemplary embodiments, the emulsion comprises: water; a water-immiscible liquid; greater than about 10% by weight one or more polymers; about 0.1% to about 5% by weight an inverting surfactant composition comprising one or more ethoxylated amine compounds; and at least about 0.5% of one or more organic or inorganic salts.

The water present in the emulsions generally includes freshwater, but saltwater or combinations with saltwater also may be used. Generally, the water used may be from any source, provided that it does not contain an excess of compounds that may adversely affect other components in the emulsion. In some embodiments, the water may be present in the emulsion in an amount in the range of from about 30% to about 50% by weight of the emulsion.

Suitable water-immiscible liquids may include, but are not limited to, water-immiscible solvents, such as paraffin hydrocarbons, naphthene hydrocarbons, aromatic hydrocarbons, olefins, oils, stabilizing surfactants and mixtures thereof. The paraffin hydrocarbons may be saturated, linear, or branched paraffin hydrocarbons. Examples of suitable aromatic hydrocarbons include, but are not limited to, toluene and xylene. In one embodiment, the water-immiscible liquid is an olefin and paraffin blend. In one embodiment, the water-immiscible liquid comprises oil and one or more emulsifiers. The water-immiscible liquid may be present in the emulsion in an amount sufficient to form a stable emulsion. In some embodiments, the water-immiscible liquid may be present in the emulsions in an amount in the range of from about 20% to about 30% by weight.

In exemplary embodiments, the emulsion comprises one or more emulsifiers. Emulsifiers, among other things, in the emulsion, lower the interfacial tension between the water and the water-immiscible liquid so as to facilitate the formation of a water-in-oil polymer emulsion. In exemplary embodiments, the emulsifier is not an ethoxylated amine compound. The emulsifier should be present in an amount sufficient to provide the desired stable water-in-oil polymer emulsion. In some embodiments, the emulsifier may be present in an amount in the range of from about 0.5% to about 5% by weight of the emulsion.

The polymer should be present in the emulsion in an amount that does not undesirably impact the emulsion's stability. In exemplary embodiments, the one or more polymers may be present in an amount in the range of from about 10% to about 35% by weight of the emulsion.

In an exemplary embodiment, the surfactant composition comprising one or more suitable inverting surfactants in addition to one or more ethoxylated amine compounds may be provided in an amount of about 1% to about 5% by weight of the emulsion.

In an exemplary embodiment, the one or more ethoxylated amine compounds may be provided in an amount of about 0.1% to about 5%, or about 0.1% to about 3% by weight of the emulsion.

In exemplary embodiments, the one or more organic or inorganic salts may be provided in an amount of about 0.5% to about the point of saturation in the emulsion.

In some embodiments, the emulsions may further comprise an inhibitor. Among other things, the inhibitor may be included to prevent premature polymerization of the monomers prior to initiation of the emulsion polymerization reaction. As those of ordinary skill in the art will appreciate, with the benefit of this disclosure, the polymer may have been synthesized using an emulsion polymerization technique wherein the inhibitor acted to prevent premature polymerization. Examples of suitable inhibitors include, but are not limited to, quinones. An example of a suitable inhibitor comprises a 4-methoxyphenol (MEHQ). The inhibitor should be present in an amount sufficient to provide the desired prevention of premature polymerization. In some embodiments, the inhibitor may be present in an amount in the range of from about 0.001% to about 0.1% by weight of the emulsion.

In some embodiments, emulsion polymerization may be used to prepare exemplary emulsions. Suitable emulsion polymerization techniques may have a variety of different initiation temperatures depending on, among other things, the amount and type of initiator used, the amount and type of monomers used, the amount and type of inhibitor used, and a number of other factors known to those of ordinary skill in the art. In one embodiment, a suitable emulsion polymerization technique may have an initiation temperature of about 25° C. Due to the exothermic nature of the polymerization reaction, the mixture may be maintained at a higher temperature than the initiation temperature during procession of the polymerization reaction, for example, in the range of from about 30° C. to about 70° C., or from about 40° C. to about 60° C.

In exemplary embodiments, the one or more polymers are in the form of a emulsion, such as a polyacrylamide emulsion. In exemplary embodiments, the emulsion comprises a hydrophilic polymer contained within water droplets that are dispersed in a continuous oil phase. In exemplary embodiments, the one or more polymers are in the form of an aqueous dispersion, for example an aqueous polymer dispersion prepared by solution polymerization. Methods for the preparation of exemplary aqueous polymer dispersions are well known in the art, for example as described in U.S. Pat. No. 5,200,448.

In exemplary embodiments, any suitable emulsion polymerization method may be employed in the preparation of the one or more polymers described here. Descriptions of the steps of an exemplary emulsion preparation provided herein, but are not intended to be limiting with respect to the methods for preparing the exemplary one or more polymers.

A preliminary emulsion is made by homogenizing oil and aqueous phases. The oil phase of the emulsion, which generally comprises from about 5 to about 35 percent by weight of the total emulsion, is comprised of one or more inert hydrophobic liquids. Preferably, the oil phase comprises about 20 to 30 percent of the emulsion. The oil used may be selected from a large class of organic liquids which are immiscible with water, including liquid hydrocarbons and substituted liquid hydrocarbons. Representative examples of such oils include benzene, xylene, toluene, mineral oils, kerosenes, naphthas, chlorinated hydrocarbons, such as perchloroethylene, and the like.

The oil phase may contain one or more primary or emulsifying surfactants, i.e. conventional emulsion polymerization stabilizers. Such stabilizers are well known to the art to promote the formation and stabilization of water-in-oil emulsions. Normally such emulsifiers have HLB values in the range of about 2 to about 10, preferably less than about 7. Suitable such emulsifiers include the sorbitan esters, phthalic esters, fatty acid glycerides, glycerine esters, as well as the ethoxylated versions of the above and any other well known relatively low HLB emulsifier. Examples of such compounds include sorbitan monooleate, the reaction product of oleic acid with isopropanolamide, hexadecyl sodium phthalate, decyl sodium phthalate, sorbitan stearate, ricinoleic acid, hydrogenated ricinoleic acid, glyceride monoester of lauric acid, glyceride monoester of stearic acid, glycerol diester of oleic acid, glycerol triester of 12-hydroxystearic acid, glycerol triester of ricinoleic acid, and the ethoxylated versions thereof containing 1 to 10 moles of ethylene oxide per mole of the basic emulsifier. Thus, any emulsifier may be utilized which will permit the formation of the initial emulsion and stabilize the emulsion during the polymerization reaction.

These primary surfactants are used alone or in mixtures and are utilized in amounts of not greater than about 5%, about 4%, or about 3% by weight of the total emulsion.

The aqueous phase generally comprises about 95 to 65 percent by weight of the emulsion. Preferably, it comprises about 80 to 70 percent thereof. In addition to water, the aqueous phase contains the monomers being polymerized, generally in an amount of less than about 50 percent, preferably about 15 to about 40 percent and most preferably about 22 to about 35 percent, by weight of the total emulsion, and generally chain transfer agents, initiators and sequesterants. Alternatively, the chain transfer agents, initiators and sequesterants may be added to the system after the preliminary emulsion has been prepared. The initiator may also be added continuously during the polymerization to control the rate of polymerization depending upon the particular monomers used and their reactivities.

Alternatively, the initiator may be present in either the oil or the aqueous phase with the monomers being added either continuously or incrementally thereafter. All of these variations are well known in the art.

The monomers suitable for use in the preparation of the exemplary polymers are described herein.

Any conventional chain transfer agent may be employed, such as propylene glycol, isopropanol, 2-mercaptoethanol, sodium hypophosphite, dodecyl mercaptan and thioglycolic acid. The chain transfer agent is generally present in an amount of about 0.1 to 10 percent by weight of the total emulsion, though more may be used.

The initiator may be any free radical producing material well known in the art. The preferred free radical initiators are the redox-type and the azo-type polymerization initiators and they are generally used in an amount of about 0.0005 to 0.5 percent by weight of the total emulsion. Radiation may also be used to initiate the reaction.

Any conventional sequesterant may also be present in the aqueous phase, such as ethylenediaminetetraacetic acid or pentasodium diethylenetriamine pentaacetate. The sequesterant is generally present in an amount of about 0.01 to 2 percent by weight of the total emulsion, though more may be utilized.

Following preparation of the preliminary emulsion, polymerization of the monomers is commenced at a temperature sufficiently high to break down the initiator to produce the desired free radicals. Generally a suitable temperature is about −20° C. to about 200° C., or about 20° C. to 100° C.

Preferably the polymerization is run at a pH of about 2 to 12 and a suitable amount of base or acid may be added to the preliminary emulsion to achieve the desired pH. The polymerization is usually completed in about an hour or two to several days, depending upon the monomers employed and other reaction variables. It is generally carried out at atmospheric pressure, but higher pressures are advantageously used when volatile ingredients are involved.

Following completion of the polymerization, the pH of the emulsion may be adjusted as desired. For an anionic polymer emulsion, this is generally about 4 to 10; for cationic emulsions about 2.0 to 5.5; and for non-ionic emulsions about 2.0 to 7.0. A breaker or inverting surfactant, or blend of inverting surfactants, is generally added to yield a single package of final product. In exemplary embodiments, a surfactant composition, as described below, is added to the polymer emulsion. Other suitable breaker or inverting surfactant may be used in combination with the exemplary polymer and exemplary surfactant composition in the emulsion. Representative inverting surfactants that may be added to the exemplary emulsions include those having a hydrophilic-lipophilic balance (HLB) of greater than 10, ethoxylated alcohols, such as ethoxylated octyl and nonyl phenols; ethoxylated nonyl phenol formaldehyde resin; polyethylene oxide esters of fatty acids; dioctyl esters of sodium sulfosuccinate and others disclosed in U.S. Pat. No. 3,624,019 incorporated herein by reference. Typically, the inverting surfactant is added in an amount equal to about 0.5 to 5 percent by weight, based on the total emulsion.

Once prepared, the emulsions of the present embodiments may be chemically modified in any known manner. "Chemically modified" is intended to cover further treatment of the dispersed water-soluble polymer and/or the addition of components to the dispersed water-soluble polymer which, without the stabilization provided by the emulsion stabilizers, would cause the normally water-soluble polymeric particles to coagulate or agglomerate. Examples of such further treatments are disclosed in U.S. Pat. Nos. 4,052,353 and 4,171,296, incorporated herein by reference. The emulsion of the present embodiments may also be concentrated in any suitable manner, such as is disclosed in U.S. Pat. No. 4,021,399, incorporated herein by reference.

A variety of different mixtures may be used to prepare an emulsion for use in the present embodiments. Suitable mixtures may include acrylamide, other monomers, water, a water-immiscible liquid, an initiator, and an emulsifier. Generally the one or more ethoxylated amine compounds can be combined with one or more inverting surfactants to form the inverting surfactant composition. The inverting surfactant composition can be added to the polymer emulsion to form a mixture. Optionally, the mixture further may comprise an inhibitor, a base (e.g., sodium hydroxide) to neutralize the monomers in acid form such that the salt of the monomer is not formed, a complexing agent to allow the gradual release of monomers in the polymerization reaction, an activator to initiate polymerization at a lower temperature, and an inverter. Those of ordinary skill in the art, with the benefit of this disclosure, will, know the amount and type of components to include in the mixture based on a variety of factors, including the desired molecular weight and composition of the polymer and the desired initiation temperature.

Generally, the exemplary emulsions are particularly suitable for use in harsh brine conditions. The exemplary emulsions may be used in a range of temperatures, for example between about 5 and about 99° C., about 50 and about 95° C., about 70 and about 95° C., about 85 and about 95° C., about 5 and about 35° C., about 5 and about 30° C., about 5 and about 25° C., about 5 and about 20° C., or about 5 and about 15° C. In exemplary embodiments, the emulsions may provide the advantages of low freeze point, low pour point and freeze-thaw stability. In exemplary embodiments, the emulsion has pour point protection of about or below −25° C.

In certain exemplary embodiments, the emulsion may be used in combination with a proppant.

Treatment Fluids

The treatment fluid, for example an aqueous treatment fluid, containing the emulsions described herein, can be used in any well treatment fluid, including but not limited to stimulation, production and completion operations. For example, the well treatment fluid can be used for hydraulic fracturing applications or in an application where friction reduction is desired. Conventional fracturing fluids typically contain natural or synthetic water soluble polymers, which are well known in the art. Water soluble polymers viscosify the aqueous liquids at relatively low concentrations due to their high molecular weight.

In an exemplary embodiment, the treatment fluid comprises water and an exemplary emulsion described herein. The treatment fluids may be prepared by mixing an exemplary emulsion with water. The additional water that is mixed with the emulsion to form the treatment fluid may be freshwater, saltwater (e.g. water containing one or more salts dissolved therein), brine (e.g. produced from subterranean formations), seawater, or combinations thereof. Generally, the water used may be from any source, provided that it does not contain an excess of compounds that may adversely affect other components in the aqueous treatment fluid or the formation itself.

In exemplary embodiments, the polymer may be present in the treatment fluid in an amount of about 0.01% to about 1% by weight of the treatment fluid.

In these applications, the treatment fluid, can be configured as a gelled fluid, a foamed gel fluid, acidic fluids, water and potassium chloride treatments, and the like. The fluid is injected at a pressure effective to create one or more fractures in the subterranean formation. Depending on the type of well treatment fluid utilized, various additives may also be added to the fracturing fluid to change the physical properties of the fluid or to serve a certain beneficial function. In one embodiment, the fluid does not contain a sufficient amount of water soluble polymer to form a gel.

In exemplary embodiments, the treatment fluid comprises a proppant.

In various exemplary embodiments, the proppants may be finely sized sands. Generally the sands are referred to by the size of mesh which the sand will pass through, and the size of mesh which the sand will not pass through. Typically, a 20-40 mesh sand is used but other sizes, such as 40-50 or 40-60, may be utilized. Sand is also characterized by the "roundness" of the sand particles. Generally rounder sand is utilized in order to create more uniform void spaces between the particles and therefore better permeability within the propped fracture. Fracturing fluids also contain, for example, viscosifiers to slow the rate at which sand will separate from the fluids and permit the sand to be carried farther into the fractures.

In other exemplary embodiments, other types of proppants may be used. For example, the proppant may be a ceramic proppant. The proppant may be a coated proppant, such as proppants with coatings with low coefficients of friction in order to reduce erosion caused by the fracturing fluid. Coatings also may be used to make the sand particles more round. Examples of such coatings include antimony trioxide, bismuth, boric acid, calcium barium fluoride, copper, graphite, indium, fluoropolymers (FTFE), lead oxide, lead sulfide, molybdenum disulfide, niobium dielenide, polytetrafluoroethylene, silver, tin, or tungsten disulfideor zinc oxide. Ceramic proppants are suggested, for example, in U.S. Pat. No. 4,555,493 to Watson et al., and low density ceramic proppants are suggested in U.S. Pat. No. 8,420,578 to Usova et al.

Fracturing fluids may also contain other components as necessary or desired. For example, the fracturing fluids may contain acids for breaking the thickening polymers, salts such as calcium chlorides to increase the density of the fluids, corrosion inhibitors or other additives in the fracturing fluids.

Also, fluid loss agents may be added to partially seal off the more porous sections of the formation so that the fracturing occurs in the less porous strata. Other oilfield additives that may also be added to the fracturing fluid include emulsion breakers, antifoams, scale inhibitors, $H_2S$ and or $O_2$ scavengers, biocides, crosslinking agents, surface tension reducers, buffers, fluorocarbon surfactants, clay stabilizers, fluid loss additives, foamers, friction reducers, temperature stabilizers, diverting agents, shale and clay stabilizers, paraffin/asphaltene inhibitors, corrosion inhibitors, and acids. For example, an acid may be included in the aqueous treatment fluids, among other things, for a matrix or fracture acidizing treatment. In fracturing embodiments, propping agent may be included in the aqueous treatment fluids to prevent the fracture from closing when the hydraulic pressure is released. In a particular embodiment, the treatment fluid further comprises a biocide.

In exemplary embodiments, the treatment fluid has a viscosity of about 0.7 cp to about 30 cp, or about 1 cp to about 25 cp.

Methods of Use

The emulsions and treatment fluids of the present embodiments may be used in any subterranean treatment. Such subterranean treatments include, but are not limited to, drilling operations, stimulation treatments, and completion operations. Those of ordinary skill in the art, with the benefit of this disclosure, will be able to recognize a suitable subterranean treatment. In exemplary embodiments, the emulsion comprises: water; a water-immiscible liquid; about 10% to about 35% by weight one or more polymers; about 0.1% to about 5% by weight an inverting surfactant composition comprising about 0.1% to about 2% of one or more ethoxylated amine compounds; and optionally, at least about 0.5% of one or more organic or inorganic salts.

In exemplary embodiments, the methods may further comprise preparing the treatment fluid, or aqueous treatment fluid. Preparing the treatment fluid may comprise providing an emulsion as described herein, and combining the emulsion with water to form the treatment fluid.

In exemplary embodiments, a method of treating a portion of a subterranean formation comprises: providing a treatment fluid of the present embodiments comprising an emulsion as described herein, and introducing the treatment fluid into the portion of the subterranean formation. In some embodiments, the treatment fluid may be introduced into the portion of the subterranean formation at a rate and pressure sufficient to create or enhance one or more fractures in the portion of the subterranean formation. The portion of the subterranean formation that the treatment fluid is introduced will vary dependent upon the particular subterranean treatment. For example, the portion of the subterranean formation may be a section of a well bore, for example, in a well bore cleanup operation. In the stimulation embodiments, the portion may be the portion of the subterranean formation to be stimulated. In exemplary embodiments, the treatment fluid may be introduced into the portion of the subterranean formation at a rate of about 30 bpm to about 250 bpm, or about 50 bpm to about 175 bpm.

In exemplary embodiments, a method of treating a subterranean formation is provided, comprising: providing a treatment fluid comprising an exemplary emulsion described herein; and introducing the treatment fluid into a subterranean formation.

In exemplary embodiments, a method of fracturing a subterranean formation is provided, comprising: (a) providing an exemplary emulsion as described herein; (b) mixing the emulsion with additional water to form a treatment fluid, wherein the one or more polymers are present in the treatment fluid in an amount of about 0.01% to about 1% by weight of the treatment fluid; and (c) introducing the treatment fluid into a subterranean formation at or above a pressure sufficient to create one or more fractures in the subterranean formation. In exemplary embodiments, the treatment fluid comprises brine. In exemplary embodiments, the exemplary emulsion or treatment fluid comprises proppant. In certain exemplary embodiments, a propping agent (or proppant) such as sand or other hard material is added to the exemplary emulsions or treatment fluids which serves to keep the fractures open after the fracturing operation.

The fractures produced may be propped using proppants, or the fracturing fluid may include reactants to react with the surface of the rock faces to result in permeability along the fracture. The fractures may be utilized in vertical or horizontal wells, to produce natural gas, light tight oil, or for injection of fluids into the formation.

Fracturing, or fracking, of formations is generally accomplished by injection of a slurry of fracturing fluid and proppant into the formation at pressures sufficiently great to exceed the tensile strength of the formation and cause the formation to separate at the point of the perforations. Formations will generally have a direction where the formation is under the least amount of stress, and the fracture will initially propagate in a plane perpendicular to the direction of such least stress. In deep formations, the weight of the overburden will generally assure that the direction of minimal stress is a horizontal direction. It is generally the goal to provide horizontal wellbores in such formation in the direction of the minimal formation stress so that fractures from the wellbore will tend to be perpendicular to the wellbore. This allows access to the maximum possible volume of formation from a horizontal wellbore of a limited length.

Any method for hydraulic fracturing of formations known in the art may utilize the exemplary emulsions and treatment fluids.

Propagation of fractures is typically halted or at least inhibited by interfaces between formations because the force exerted at the tip of the fracture can be dispersed at the interface of the formations. Larger fractures may therefore tend to have more rectangular shapes rather than disk shapes as the dimensions of the fracture exceed the height of the formation, and the fracture therefore grows laterally rather than continuing to grow vertically.

In exemplary embodiments, methods for improving friction reduction properties of a treatment fluid, comprising: (i) providing an exemplary emulsion as described herein; and (ii) inverting the emulsion in the treatment fluid comprising brine. In certain embodiments, the resultant treatment fluid has an improvement in friction reduction, when compared to a similar treatment fluid in which the inverted emulsion that does not contain the one or more ethoxylated amine compounds.

In certain embodiments, the emulsion further comprises an emulsifier. In one embodiment, the improved friction reduction property is the percent friction reduction of the treatment fluid. In one embodiment, the improvement in friction reduction is in the range of about 100% and about 1000%. In one embodiment, the improved friction reduction property is the time to achieve maximum friction reduction.

In exemplary embodiments, a method for improving friction reduction properties of a treatment fluid comprises: (i) providing an emulsion comprising: water; a water-immiscible liquid; about 10% to about 35% by weight one or more polymers; about 1% to about 5% by weight one or more emulsifying surfactants; about 0.1% to about 5% by weight of an inverting surfactant composition comprising one or more inverting surfactants and one or more ethoxylated amine compounds; and at least about 0.5% of one or more organic or inorganic salts; and (ii) inverting the emulsion in the treatment fluid comprising brine; wherein the resultant treatment fluid has an improvement in friction reduction, when compared to a similar treatment fluid in which the inverted emulsion that does not contain the one or more ethoxylated amine compounds.

In certain embodiments, the emulsions described herein provide improved or lower freezing points than similar emulsions prepared without the one or more ethoxylated amine compounds. In certain embodiments, the emulsions described herein provide improved or lower freezing points than similar emulsions prepared without one or more ethoxylated amine compounds. In one embodiment, a method for improving or lowering the freezing point of a treatment fluid comprises: (i) providing an exemplary emulsion as described herein; and (ii) inverting the emulsion in a treatment fluid containing brine. In certain embodiments, the emulsion has an improvement in freezing point, when compared to a similar emulsion that does not contain the one or more ethoxylated amine compounds. In certain embodiments, the emulsion has an improvement in freezing point, when compared to a similar emulsion that does not contain the surfactant composition and one or more ethoxylated amine compounds.

The surfactant compositions, emulsions and treatment fluids of the present embodiments may have various uses, for example in crude oil development and production from oil bearing formations that can include primary, secondary or tertiary (enhanced) recovery. Chemical techniques, including for example injecting surfactants (surfactant flooding) to reduce interfacial tension that prevents or inhibits oil droplets from moving through a reservoir or injecting polymers that allow the oil present to more easily mobilize through a formation, can be used before, during or after implementing primary and/or secondary recovery techniques. Such techniques can also be used for enhanced oil recovery, or to complement other enhanced oil recovery techniques.

The surfactant compositions, emulsions and treatment fluids of the present embodiments may be used in any oil recovery technique, for example an oil recovery technique where the reduction of friction or interfacial tension is desired, or where mobilization of oil is desired. In exemplary embodiments, a method comprising using a surfactant composition, emulsion or treatment fluid as described herein for oil recovery, including but not limited to enhanced oil recovery, is provided. In exemplary embodiments, the method comprises providing a treatment fluid comprising an emulsion comprising one or more polymers and an exemplary surfactant composition described herein; and introducing the treatment fluid into a subterranean formation; and recovering hydrocarbons from the subterranean formation. In exemplary embodiments, the method comprises providing an emulsion comprising one or more polymers and an exemplary surfactant composition described herein; and introducing the emulsion into a subterranean formation; and recovering hydrocarbons from the subterranean formation.

In certain exemplary embodiments, the methods further comprise adding a proppant.

The term "brine" or "aqueous brine" as used herein refers to sea water; naturally-occurring brine; a chloride-based, bromide-based, formate-based, or acetate-based brine containing monovalent and/or polyvalent cations or combinations thereof. Examples of suitable chloride-based brines include without limitation sodium chloride and calcium chloride. Further without limitation, examples of suitable bromide-based brines include sodium bromide, calcium bromide, and zinc bromide. In addition, examples of formate-based brines include without limitation, sodium formate, potassium formate, and cesium formate.

The following examples are presented for illustrative purposes only, and are not intended to be limiting.

EXAMPLES

In these examples, the impact of exemplary ethoxylated amine compounds on inversion properties of certain polymer emulsion compositions is evaluated by measuring the friction reduction performance of polymer emulsions.

Materials and Methods for Examples 1 and 2:

I. Brine

Marcellus Brine was used in the following examples. The composition of the brine is provided in Table 1.

TABLE 1

Brine composition

| Ions | ppm |
| --- | --- |
| Na$^+$ | 41,675 |
| K$^+$ | 17,820 |
| Ca$^{2+}$ | 10,467 |
| Fe$^{2+}$ | 110 |
| Cl$^-$ | 34,713 |
| SO$_4^{2-}$ | 190 |
| Total Dissolved Solids | 104,975 |

II. Polymer Emulsions

A polyacrylamide emulsion was prepared by addition of a monomer phase to a surfactant containing oil phase with homogenization. The resulting monomer emulsion was polymerized using free radical polymerization chemistry in the presence of adequate agitation and cooling, which resulted in a high molecular weight anionic polymer emulsion. The polymerization of acrylamide and co-monomers in an inverse emulsion resulted in a polymer emulsion containing sterically stabilized inverse lattices. The average particle size of the inverse emulsions was typically 0.7-1.5 micron. After polymerization, an inverting surfactant system was added to allow for rapid dilution and dissolution in water.

III. Friction Loop Testing

The friction loop is a laboratory instrument designed to simulate well fracturing flow conditions. Fracturing in the field often requires pumping over 50 barrels per minute through a ~4.5" bore which results in a highly turbulent flow (Reynolds number: 500,000 to 5,000,000). Although it is not possible to achieve this kind of flow in the lab, the friction loop designed simulates the field conditions to the maximum known extent (Reynolds number: 120,000). The data generated by this laboratory scale friction loop is accurate and widely accepted by the industry. The main components of the friction loop are: centrifugal pump, magnetic flow meter and a differential pressure transmitter to create and monitor necessary conditions. All pipes and other components are constructed using stainless steel 316L/304L material.

To test the friction reduction property of the polymer, the friction loop reservoir was filled with 20 L of the required brine (see above table for recipes of various brines). This brine was then re-circulated through the friction loop at a flow rate of 24 gallons per minute across a five-foot section of half-inch diameter pipe (required to generate the above mentioned Reynolds number). The baseline pressure drop was measured. The polymer was now added (at a measured concentration of 0.5 gallons of polymer per thousand gallons of brine or 0.5 GPTG) to the recirculating brine solution, where it inverted and dissolved. The degree of friction reduction (% FRt) at a given time 't' was calculated from the initial pressure drop ΔPi and the pressure drop at time t, ΔPt using the equation:

$$\% \ FR_t = \frac{\Delta P_i - \Delta P_t}{\Delta P_i} \times 100$$

Example 1

A standard polyacrylamide emulsion with a polymer composition of 30 mole % ammonium acrylate and 70 mole % acrylamide was prepared. The active polymer concentration of the emulsion was 15 wt %. To this emulsion was added various blends of commercially available inverting surfactants (for example, Samples A, B, C, D, E, F and G) and, to some samples, ethoxylated amine compounds (for example, Sample G includes 0.90 wt % polyoxyethylene tallow amine), to provide a total of 3.25 wt %. A commercially-available emulsion containing 3 wt % of an inverting surfactant (Sample H) was also tested. No additional inverting surfactants were added to Sample H. The surfactants and ethoxylated amine compounds were premixed prior to addition to the emulsion. The performance parameters of friction reduction which include the Max FR (maximum friction reduction), T90 (time to 90% friction reduction, a simple measure of inversion rate) and Tmax (time to maximum friction reduction) were measured in cold (about 40° F.) Marcellus brine. The pour point, and freeze/thaw stability of the emulsion was also determined. The results are shown in Table 2.

TABLE 2

Friction Reduction Performance of Polymer Emulsions with Exemplary Ethoxylated Amine Compounds in Marcellus Brine at about 40° F.

| Sample | Max FR (%) | $T_{max}$ (s) | $T_{90}$ (s) | Pour Point (° C.) | Freeze/Thaw Recovery Y/N | Gal/1000 gal |
| --- | --- | --- | --- | --- | --- | --- |
| 1-A | 51.2 | 159 | 94 | −30 | Y | 1.0 |
| 1-B | 57.6 | 86 | 61 | −5 | N | 1.0 |
| 1-C | 37.4 | 289 | 133 | −30 | Y | 1.0 |
| 1-D | 48.2 | 218 | 138 | −20 | Y | 1.0 |
| 1-E | 47.0 | 221 | 114 | −30 | Y | 1.0 |
| 1-F | 50.7 | 142 | 88 | −25 | Y | 1.0 |

TABLE 2-continued

Friction Reduction Performance of Polymer Emulsions
with Exemplary Ethoxylated Amine Compounds
in Marcellus Brine at about 40° F.

| Sample | Max FR (%) | $T_{max}$ (s) | $T_{90}$ (s) | Pour Point (° C.) | Freeze/Thaw Recovery Y/N | Gal/1000 gal |
|---|---|---|---|---|---|---|
| 1-G | 53.2 | 56 | 31 | −30 | Y | 0.5 |
| 1-H | 54.8 | 95 | 61 | −10 | Y | 0.5 |

Example 2

Experimental emulsion polyacrylamides (EPAM) with the added ethoxylated amine compound (Sample 1-G) was tested on the friction loop at a flow rate of 24 GPM and at temperature of 5° C. The water used for the test was Marcellus brine (see Table 1 for brine composition). The results were compared to a commercially available emulsion (Sample 1-H) and a standard laboratory prototype (Sample 1-A) that did not contain an ethoxylated amine compound. The results are summarized in Table 3 below.

TABLE 3

Friction Reduction Performance of Polymer Emulsions with
Exemplary Surfactants in Marcellus Brine at 5° C.

| Sample | Max FR (%) | Tmax (s) | T90 (s) | Dosage (gal/1000 gal) |
|---|---|---|---|---|
| 1-G | 53.2 | 56 | 31 | 0.5 |
| 1-H | 54.8 | 95 | 61 | 0.5 |
| 1-A | 35.0 | 183 | 110 | 1.0 |

Figure 2:
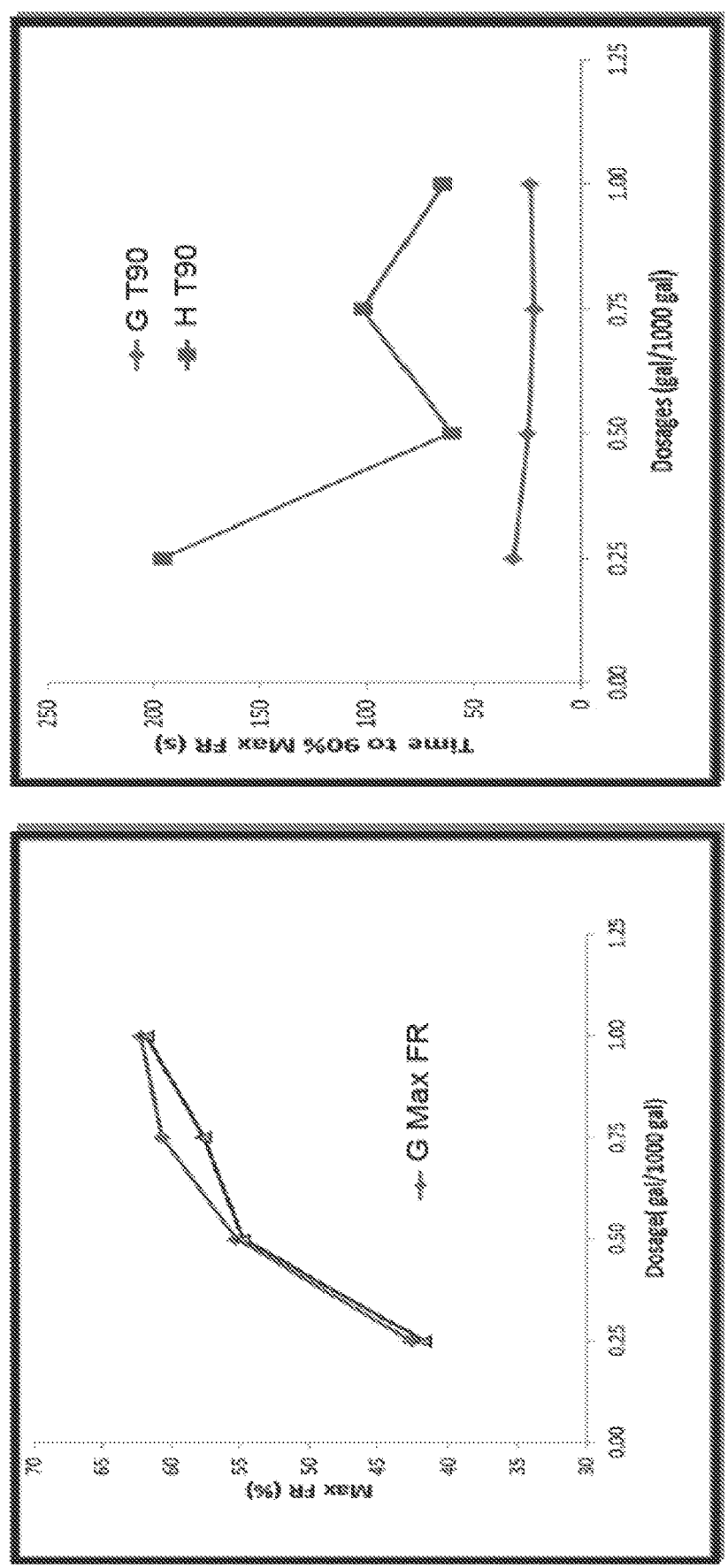
FIG. 2 shows the maximum friction reduction achieved and the time to 90% maximum friction reduction in Marcellus brine at 5° C. for various dosages of an exemplary emulsion to a commercially available emulsion.

The friction reduction profile, as well as dose response results for Samples G and H are shown in FIGS. 1 and 2.

Example 3

In this example, the fast inversion and maximum friction reduction properties of exemplary emulsions were tested in the friction loop and the proppant carrying capacity was measured with the viscoelastic measurements on the rheometer using dynamic measurement techniques. A combination of oscillatory and rotational measurements were performed on the emulsion in the linear viscoelastic region to study the viscoelastic properties of the polymer.

It is known in the literature that when stress is applied to a polymer, if the storage modulus of the polymer (G') is higher than the loss modulus (G"), it behaves as an elastic or semi-solid material. If G'<G", then it flows when shear stress is applied. For two polymers that have the same viscosity, the polymer that has G'>G" at any given frequency, is said to carry proppant more efficiently than the one that has G">G'. Crossover frequency is defined as the frequency at which G'=G". The lower the crossover frequency, longer the relaxation time and better the elasticity of the polymer and hence the proppant carrying ability.

Experimental

Figure 3:
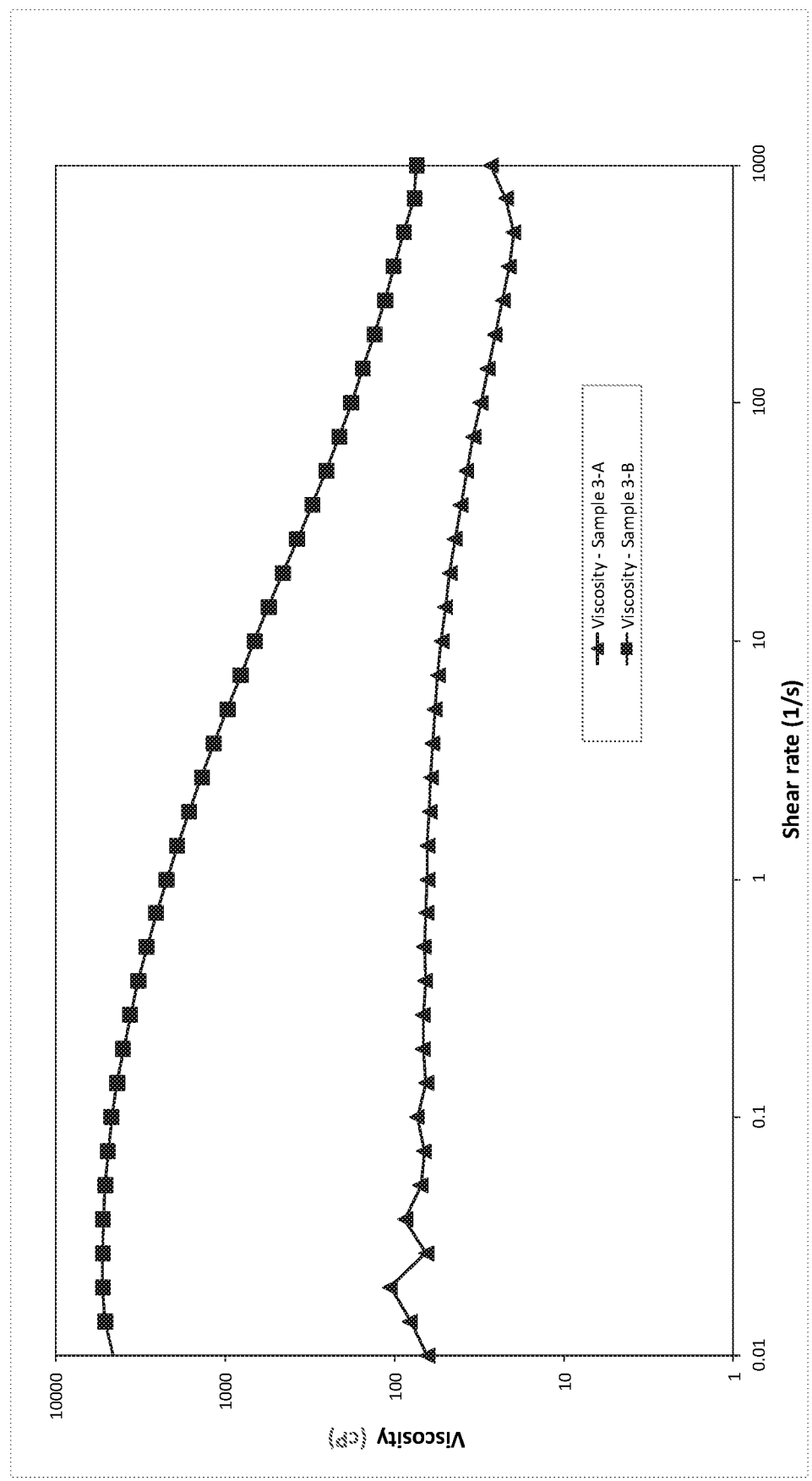
FIG. 3 shows viscosity measurements performed on exemplary and comparative emulsions.
Figure 4:
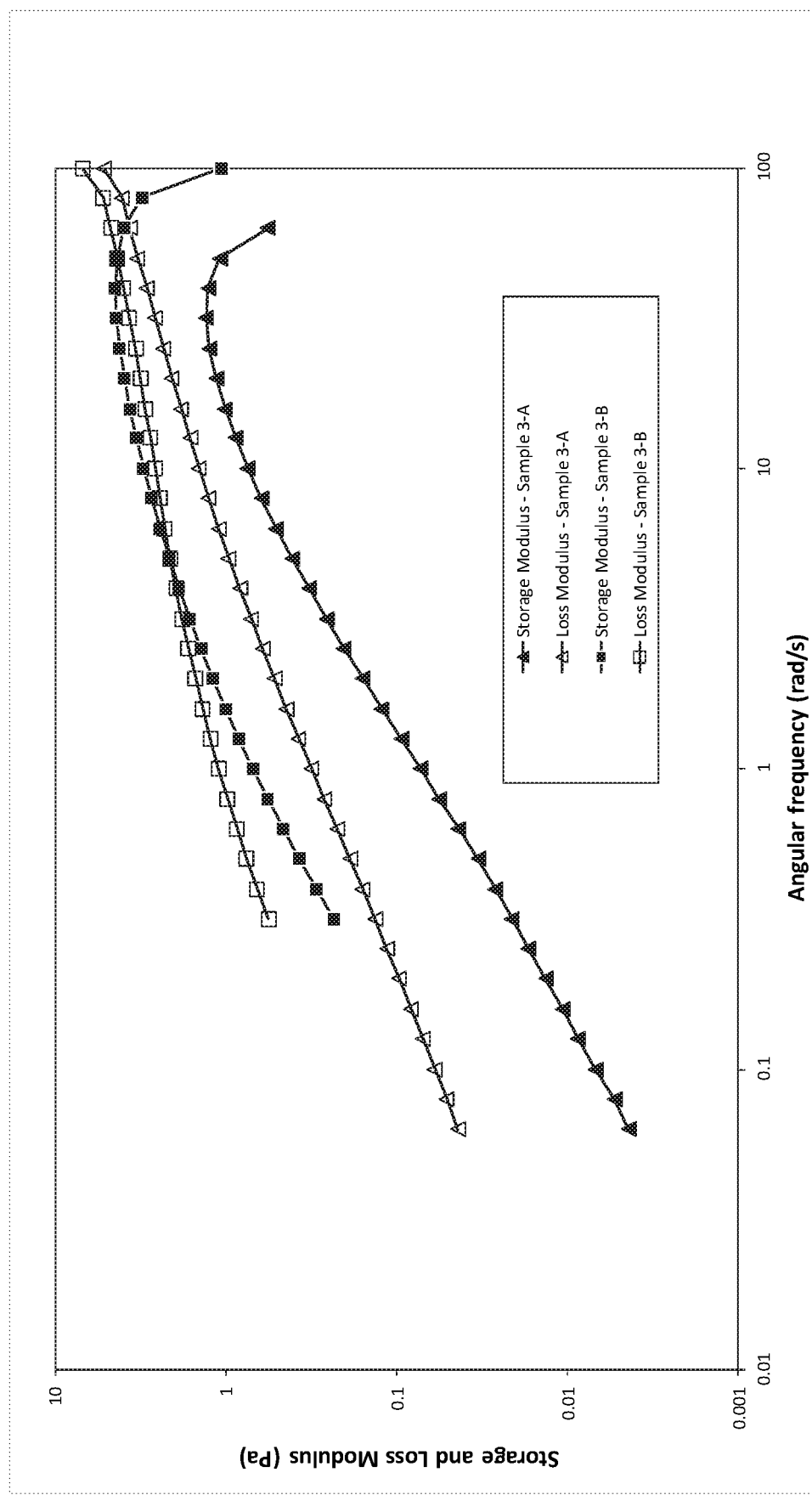
FIG. 4 shows oscillatory measurements performed on exemplary and comparative emulsions in Marcellus brine at 25° C.

A standard polyacrylamide emulsion with a polymer composition of 30 mole % ammonium acrylate and 70 mole % acrylamide was prepared. The active polymer concentration of the emulsion was 28 wt %. Sample 3-A, a comparative example, has a blend of commercially available inverting surfactants. Sample 3-B, which is an exemplary emulsion, has a surfactant blend containing ethoxylated amine compound (polyoxyethylene tallow amine). The surfactants and ethoxylated amine compounds were premixed prior to addition to the emulsion. The performance parameters of friction reduction which include the Max FR (maximum friction reduction), $t_{90}$ (time to 90% friction reduction, a simple measure of inversion rate) and $t_{max}$ (time to maximum friction reduction) were measured in ambient (about 72° F.) Marcellus brine. The freeze/thaw stability of the emulsion was also determined. The viscoelastic performance was measured in the Anton Paar Rheometer in the linear viscoelastic region for the emulsions. A frequency sweep from 0.01 to 100 rad/s was done at 25° C. in Marcellus brine. The crossover frequency was noted from the results. A shear rate sweep from 0.01 to 1000 s$^{-1}$ revealed the viscosity at 518 s$^{-1}$, which is shown in FIG. 3. The results are shown in Table 4. In contrast to Sample 3-A, the presence of a crossover frequency as shown in FIG. 4 in the measurement range suggests that Sample 3-B has enough elasticity to suspend the proppant.

TABLE 4

Friction Reduction Performance of Polymer Emulsions
with Exemplary Ethoxylated Amine Compounds
in Marcellus Brine at about 72° F.

| Sample | Max FR (%) | $t_{max}$ (s) | $t_{90}$ (s) | Crossover Frequency (rad/s) | Freeze/Thaw Recovery Y/N | Viscosity at 518 s$^{-1}$ (cP) |
|---|---|---|---|---|---|---|
| 3-A | 37 | 180 | 65 | None | Y | 20 |
| 3-B | 52 | 87 | 50 | 4.7 | Y | 64 |

In the preceding specification, various embodiments have been described with reference to the examples. It will, however, be evident that various modifications and changes may be made thereto, and additional embodiments may be implemented, without departing from the broader scope of the exemplary embodiments as set forth in the claims that follow. The specification and drawings are accordingly to be regarded in an illustrative rather than restrictive sense.

What is claimed is:

1. An emulsion comprising:
   a) water;
   b) a water-immiscible liquid;
   c) greater than about 10% by weight one or more polymers;
   d) an inverting surfactant composition comprising one or more inverting surfactants and one or more ethoxylated amine compounds selected from the group consisting of polyoxyethylene tallow amine, polyoxyethylene oleic amine, polyoxyethylene palmitic amine, polyoxyethylene stearic amine, polyoxyethylene myristic amine and polyoxyethylene linoleic amine, wherein the inverting surfactant composition comprises about 65 to about 85 wt % of the one or more inverting surfactants and about 15 to about 35 wt % of the one or more ethoxylated amine compounds; and
   e) optionally, at least about 0.5% of one or more organic or inorganic salts.

2. The emulsion of claim 1, wherein the one or more of the polymers is an acrylamide-containing polymer.

3. The emulsion of claim 1, wherein the one or more polymers comprises acrylamide or partially hydrolyzed acrylamide and one or more monomers selected from the group consisting of acrylic acid and salts thereof.

4. The emulsion of claim 1, wherein the one or more ethoxylated amine compounds is polyoxyethylene tallow amine.

5. The emulsion of claim 1, wherein the inverting surfactant composition comprises about 20 to about 30 wt % of the one or more ethoxylated amine compounds selected from the group consisting of polyoxyethylene tallow amine, polyoxyethylene oleic amine, polyoxyethylene palmitic amine, polyoxyethylene stearic amine, polyoxyethylene myristic amine and polyoxyethylene linoleic amine.

6. The emulsion of claim 1, wherein the emulsion comprises about 0.1% to about 5% by weight of the inverting surfactant composition.

7. The emulsion of claim 6, further comprising about 1% to about 5% by weight of one or more emulsifying surfactants.

8. The emulsion of claim 1, wherein the one or more inverting surfactants is selected from the group consisting of polyoxyethylene sorbitol tetraoleate; polyethylene glycol monoleate; ethoxylated alcohols, ethoxylated octyl and nonyl phenols; ethoxylated nonyl phenol formaldehyde resin; polyethylene oxide esters of fatty acids and dioctyl esters of sodium sulfosuccinate.

9. A treatment fluid comprising an emulsion of claim 1 and additional water; wherein the one or more polymers are present in the treatment fluid in an amount of about 0.01% to about 1% by weight of the treatment fluid.

10. The treatment fluid of claim 9, further comprising a proppant.

11. A method of treating a subterranean formation, comprising: providing a treatment fluid comprising an emulsion of claim 1; and introducing the treatment fluid into a subterranean formation.

12. The method of claim 11, further comprising adding a proppant to the treatment fluid.

13. A method of fracturing a subterranean formation, comprising:
(i) providing an emulsion of claim 1;
(ii) mixing the emulsion with additional water or brine to form a treatment fluid, wherein the one or more polymers are present in the treatment fluid in an amount of about 0.01% to about 1% by weight of the treatment fluid; and
(iii) introducing the treatment fluid into a subterranean formation at or above a pressure sufficient to create one or more fractures in the subterranean formation.

14. The method of claim 13, wherein the treatment fluid comprises brine.

15. The method of claim 13, wherein the treatment fluid further comprises a proppant.

16. A method for improving or lowering the freezing point of a treatment fluid comprises:
(i) providing an emulsion of claim 1; and
(ii) inverting the emulsion in a treatment fluid containing brine; wherein the emulsion has an improvement in freezing point, when compared to a similar emulsion that does not contain the one or more ethoxylated amine compounds.

17. The method of claim 16, wherein the treatment fluid further comprises a proppant.

* * * * *